J. Montgomery
Manufacturing Tubular Bodies.
Nº 71508. Patented Nov. 26, 1867.

Witnesses.

Inventor.
James Montgomery

United States Patent Office.

JAMES MONTGOMERY, OF CROTON, NEW YORK.

*Letters Patent No. 71,508, dated November 26, 1867.*

IMPROVED METHOD OF MANUFACTURING TUBULAR BODIES.

*The Schedule referred to in these Letters Patent and making part of the same.*

TO ALL WHOM IT MAY CONCERN:

Be it known that I, JAMES MONTGOMERY, of the village of Croton, in the county of Westchester, and State of New York, have invented a new and useful Improvement in the Manufacture of Hollow Wrought-Metal Bodies, of cylindrical and other shape, applicable to shafts, axles, pillars, cannon, tubular rods, and other articles, of which the following is a full, clear, and exact description. reference being had to the accompanying drawing, forming part of this specification, and in which—

Figure 1:
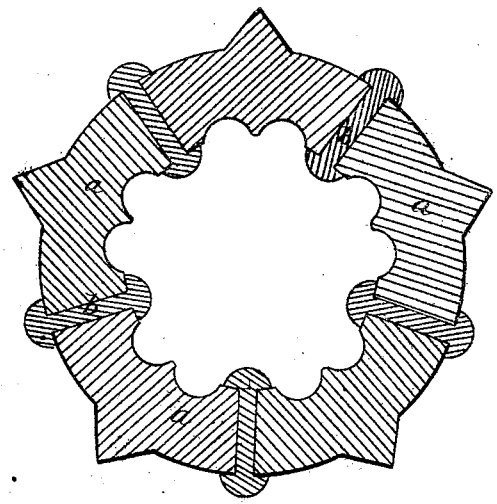
Figure 2:
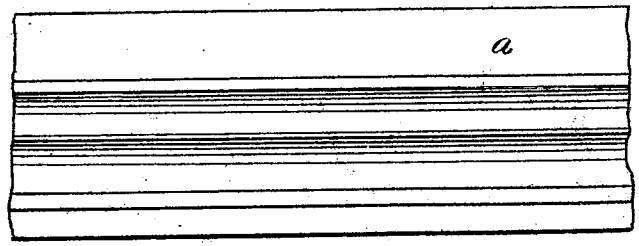
Figure 3:
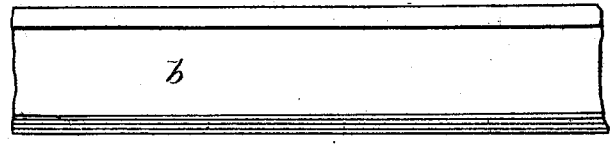

Figure 1 represents an end view of a structure of cylindrical character, in the process of being manufactured, or prior to welding, with its parts constructed according to my improvement, and Figures 2 and 3 longitudinal views of bars used in carrying out the same.

Similar letters of reference indicate corresponding parts.

The nature of my invention consists in constructing wrought-metal bodies of a hollow character, of segmental or separate bars, held together, for the purpose of swaging or welding, by I-shaped or double-headed bars, which are afterwards welded and incorporated with the segmental or main bars, by being hammered, or rolled, or otherwise subjected to pressure, while at a welding heat.

The various purposes to which this my improvement is applicable are numerous. It will suffice here, however, to mention shafts, pillars, cannon, and piston-rods; but I do not restrict myself to bodies of a cylindrical character, whether plain or corrugated on their surface or surfaces, so long as the structure, whatever may be the purpose for which it is designed, is of a hollow description, and made up of separate bars arranged together and welded or incorporated, substantially as hereinafter described, for the construction of a body of cylindrical character.

Referring to the accompanying drawing, to form, say, a hollow circular shaft or pillar, which may, if desired, be corrugated externally and internally, I cause to be rolled the requisite number of segmental bars $a$, and intermediate I-shaped bars $b$, which latter, by their double heads, serve to hold up, or in their place, the segmental bars $a$, whilst being heated for welding, and in handling of the mass for afterwards incorporating by the hammer or rolls, the several bars to make up a cylinder or tube of a solid or united character. Were it not for the double-headed intermediate bars $b$, it would be very difficult, if not impossible, to keep the segmental bars $a$ from dropping out of place, however well held by outside clips or withes, as the mass is turned in the fire or furnace where it is being heated for welding, as well as difficult, whilst being hammered or rolled, to keep it in form, or the bars $a$ in their places, even though supported by a mandrel, which requires to be shifted.

It is not only to large structures that this mode of making hollow or tubular bodies is applicable, though its advantages are, perhaps, more prominent in such connection, but to smaller bodies as well, it being advantageous in either case in point of strength and freedom from flaws, as well as in other respects, to manufacture such structures from separate bars, which may be made of superior quality.

It is unnecessary here to refer to the general advantages of hollow over solid bodies for such articles as pillars, shafts, and rods, and of corrugations on their exterior and interior, or either, where corrugations are admissible. Where the body to be produced is of other than cylindrical character, as oval, for instance, or of a taper form, of course the main bars $a$ and intermediate double-headed bars $b$ should be proportionately shaped. The intermediate bars $b$ may or may not extend the whole length of the structure. When welded with the main bars they, of course, lose their separate identity. The edges of the segmental or main bars may be rolled of tongue-shape, so as to receive the double heads of the I-shaped bars within them, causing the outer surfaces of said heads to lie flush with the outer and inner faces of the main bars. This mode of construction may be preferred, where the invention is applied to the manufacture of cannon.

What I claim as my invention, and desire to secure by Letters Patent, is—

The construction of hollow wrought-metal bodies, by combining with segmental or main bars $a$, intermediate double-headed bars $b$, and afterwards welding the same together, substantially as specified.

JAMES MONTGOMERY.

Witnesses:
 J. W. COOMBS,
 G. W. REED.